US008113363B2

(12) United States Patent
Wimmer

(10) Patent No.: US 8,113,363 B2
(45) Date of Patent: Feb. 14, 2012

(54) ADJUSTING MECHANISM FOR A WINCH

(75) Inventor: Eckhard Wimmer, Hallein (AT)

(73) Assignee: Palfinger AG, Bergheim (AT)

( * ) Notice: Subject to any disclaimer, the term of this patent is extended or adjusted under 35 U.S.C. 154(b) by 246 days.

(21) Appl. No.: 12/607,261

(22) Filed: Oct. 28, 2009

(65) Prior Publication Data

US 2010/0078403 A1 Apr. 1, 2010

Related U.S. Application Data

(63) Continuation of application No. PCT/AT2008/000135, filed on Apr. 14, 2008.

(30) Foreign Application Priority Data

May 3, 2007 (AT) ................................ GM 273/2007

(51) Int. Cl.
*F16H 21/54* (2006.01)

(52) U.S. Cl. ........................................................ 212/299

(58) Field of Classification Search .................. 74/522.5; 212/181, 294, 299; 414/543, 758, 769
See application file for complete search history.

(56) References Cited

U.S. PATENT DOCUMENTS

| | | | | |
|---|---|---|---|---|
| 3,874,532 | A * | 4/1975 | Metailler | 414/694 |
| 3,939,988 | A * | 2/1976 | Wellman | 212/297 |
| 4,950,125 | A * | 8/1990 | Gravenhorst | 414/569 |
| 5,006,037 | A * | 4/1991 | Bluemle | 414/771 |
| 5,387,071 | A * | 2/1995 | Pinkston | 414/563 |
| 5,725,112 | A | 3/1998 | Thorby | |
| 6,494,437 | B1 * | 12/2002 | Boyer | 254/323 |
| 7,080,826 | B2 * | 7/2006 | Pockl et al. | 254/332 |
| 7,677,337 | B2 * | 3/2010 | Poeckl et al. | 175/162 |
| 2006/0016775 | A1 | 1/2006 | Willim | |

FOREIGN PATENT DOCUMENTS

| | | |
|---|---|---|
| DE | 30 30 796 | 2/1982 |
| DE | 200 23 565 | 12/2004 |
| DE | 20 2004 009 782 | 12/2005 |
| EP | 0 386 632 | 9/1990 |
| EP | 1 477 450 | 11/2004 |

OTHER PUBLICATIONS

International Search Report issued Sep. 10, 2008 in International (PCT) Application No. PCT/AT2008/000135.

Austrian Search Report issued Feb. 8, 2008 in Austrian Application No. GM 273/2007.

* cited by examiner

*Primary Examiner* — Charles A Fox

(74) *Attorney, Agent, or Firm* — Wenderoth, Lind & Ponack, L.L.P.

(57) ABSTRACT

An arrangement includes a winch that is preferably used for hoisting loads as well as an adjusting mechanism for the winch. In the assembled state, the winch is mounted on a crane boom so as to be movable by a limited degree between an operating position and a transported position by means of the adjusting mechanism. The adjusting mechanism is equipped with at least one linear drive unit which cooperates with a lever gear to adjust the winch.

18 Claims, 3 Drawing Sheets

ADJUSTING MECHANISM FOR A WINCH

This application is a Continuation of International application No. PCT/AT2008/000135, filed Apr. 14, 2008.

BACKGROUND OF THE INVENTION (1) Field of the Invention

The present invention relates to an arrangement with a winch, which is provided preferably for hoisting loads, and an adjusting mechanism for the winch, wherein the winch when being assembled on a crane arm can be moved to a limited extent between a working position and a transport position by way of the adjusting mechanism, wherein the adjusting mechanism comprises at least one linear drive.

The invention further relates to a crane arm, in particular for vehicles, with an arrangement of the type to be described and also, in addition, to a crane with a crane pillar and with at least one crane arm which is mounted so as to be movable relative to the crane pillar.

(2) Description of Related Art

An arrangement of the type mentioned at the outset is used, for example, in connection with transport vehicles so as to move the winch, when not in use, into a position in which it assumes, with the other components of a loading crane, a position which is as compact as possible. In this way, the overall height of the vehicle can be reduced in order to form, for example during travel, as little air resistance as possible or in order to be able to maneuver the vehicle more easily—in particular within buildings. Mounting of the winch on a crane arm of a transport vehicle with limited movability between a transport and a working position is in principle already known; nevertheless, the adjusting mechanism for moving the winch is in this case provided in a relatively complex manner.

The object of the present invention is therefore to disclose an improved adjusting mechanism for moving the winch between the working and transport position, allowing complex design components to be substantially dispensed with.

BRIEF SUMMARY OF THE INVENTION

According to the invention, in an advantageous embodiment, this is achieved in that the linear drive interacts with a lever apparatus in order to adjust the winch, wherein the lever apparatus comprises at least one knee lever.

The linear drive is expediently embodied as a, preferably hydraulically operable, piston-cylinder unit. The advantages of a hydraulic cylinder are already known, as a hydraulic linear motor of this type allows very high forces to be transmitted, very uniform and exact movement being possible owing to the low compressibility of the hydraulic fluid. The energy, which is supplied from a hydraulic pressure accumulator or a hydraulic pump, is in this case converted into an easily controllable and rectilinearly acting force. Preferably, at least one double-acting cylinder is used when carrying out the invention, whereby two active directions of movement can be attained. According to the present invention, the piston-cylinder unit now interacts with a lever apparatus comprising a knee lever, wherein complex design components, such as for example gear wheels, toothed racks or the like, may be dispensed with. The lever apparatus is in this case advantageously embodied in such a way that it converts a linear movement of the linear drive, preferably of the piston-cylinder unit, into a pivoting movement of the winch.

According to an embodiment of the invention, the lever apparatus acts on a bearing part of the winch. In this connection, it can be advantageous when the bearing part has at least one pivot axis and at least one rotatable articulation point which is arranged offset from said pivot axis, the lever apparatus acting on the rotatable articulation point.

According to an embodiment of the invention, it can be provided that the piston-cylinder unit, when assembled on a crane arm, with its end of the cylinder—that is remote from the piston-engages with the crane arm. It is also within the scope of the invention to provide in this case the kinematic reversal solution, that is to say that the end of the cylinder that is remote from the piston rests on the winch and the free end of the piston rod rests on the crane arm.

According to a preferred embodiment of the invention, it can be provided that the lever apparatus comprises at least one knee lever. In this case, it may be beneficial if the linear drive acts on the knee of the knee lever.

The use of a knee lever has proven beneficial in so far as it is possible to generate, by way of a linear movement performed by the piston-cylinder unit, a high force acting on the knee joint in the direction of the notional connecting line between the two lever ends of the knee lever that are remote from the knee joint. The more the knee lever is sheared apart, the higher the force in this case is. The adjusting mechanism according to the invention with the knee lever allows the considerable total weight of the winch with its cable drum and the cable wound thereon to be moved without difficulty between the working position and the transport position.

The crane arm according to the invention is characterized in that it has an arrangement of the described type.

The crane according to the invention has a crane pillar and at least one crane arm which is mounted so as to be movable relative to the crane pillar, said crane comprising an arrangement of the type in question. In a possible embodiment of the invention, provision may also be made for the crane pillar and the crane arm to be formed in one piece.

BRIEF DESCRIPTION OF THE DRAWINGS

Further details and advantages of the present invention will be described in more detail with the aid of the description of figures, in which.

DETAILED DESCRIPTION OF THE INVENTION

Figure 1A:
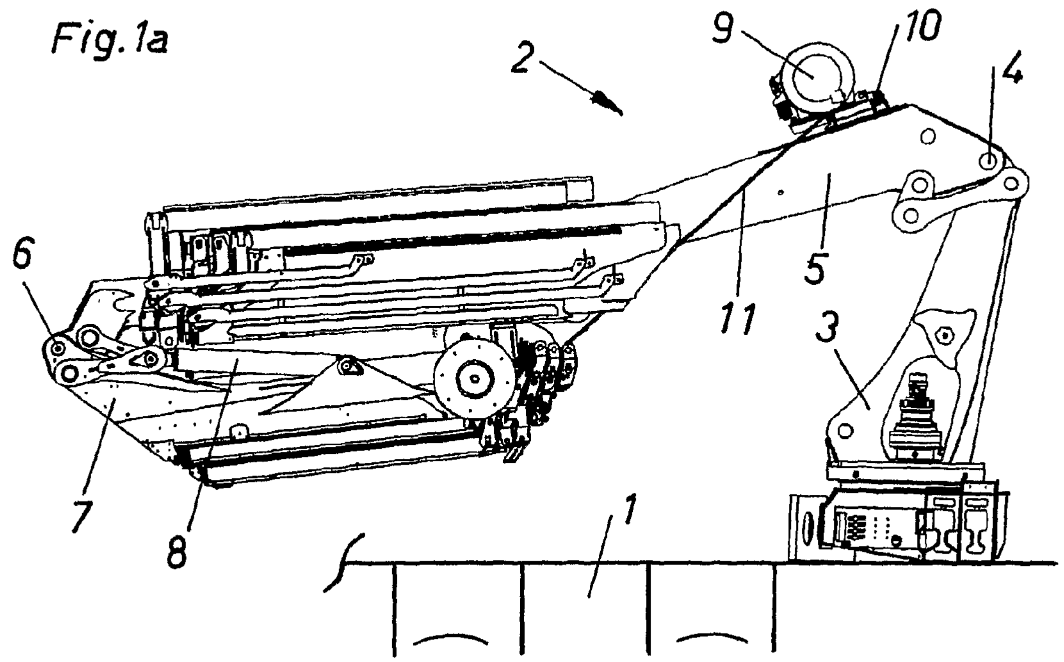
FIG. 1*a*, 1*b* show side views of a loading crane mounted on a motor vehicle with the winch in the working position as well as in the transport position.
Figure 1B:
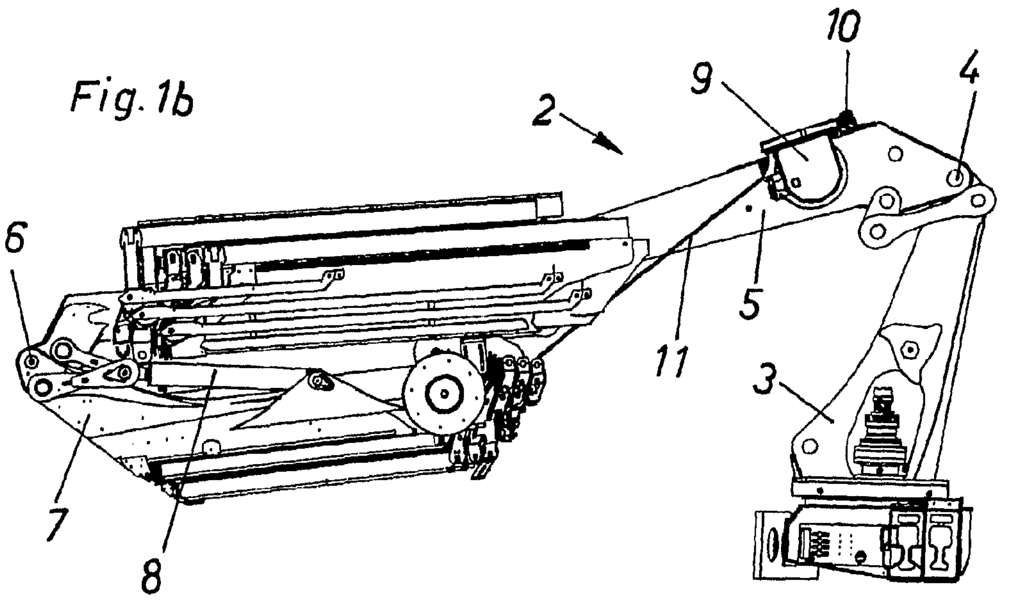

FIG. 1 a and FIG. 1*b* show schematically a loading crane 2 mounted on a vehicle 1 (which is merely indicated). The loading crane 2 consists substantially of a crane pillar 3 which can rotate about a vertical axis, a crane arm 5 which can pivot, counter thereto, about the axis 4, and a telescopically extendable folding arm 7 which can pivot about the axis 6 relative to the crane arm 5. The folding arm 7 is pivoted relative to the crane arm 5 in principle by way of the folding cylinder 8. A detailed description with regard to the embodiment of the loading crane per se or the configuration of the various possibilities for movement will be dispensed with in the scope of the present invention, as these are already known in many variants in the art. Significant is the winch 9 which is arranged preferably on the crane arm 5 and has its adjusting mechanism 10 which can be used to move, preferably to pivot, the winch 9 selectively into a working and a transport position. A cable 11 can be wound in several layers onto the winch 9. The cable 11 can be used either for hoisting loaded goods or else to telescope or else to pivot jibs of the loading crane 2. In FIG. 1*a* the winch 9 protrudes upward from the crane arm 5, whereas in FIG. 1*b* the winch 9 has been pivoted downward about an axis, so that according to FIG. 1*b* the upper side of the winch 9 can be arranged at least approximately coplanarly with the upper side of the crane arm 5. FIG. 1*a* marks preferably the working position of the winch 9, whereas the winch 9 assumes in FIG. 1*b* the transport position, resulting in a reduced overall height of the total arrangement. It should however be noted in this connection that, depending on the crane type and construction of the loading crane 2, the folded-down position according to FIG. 1*b* may also be the transport or else the working position.

Figure 2A:
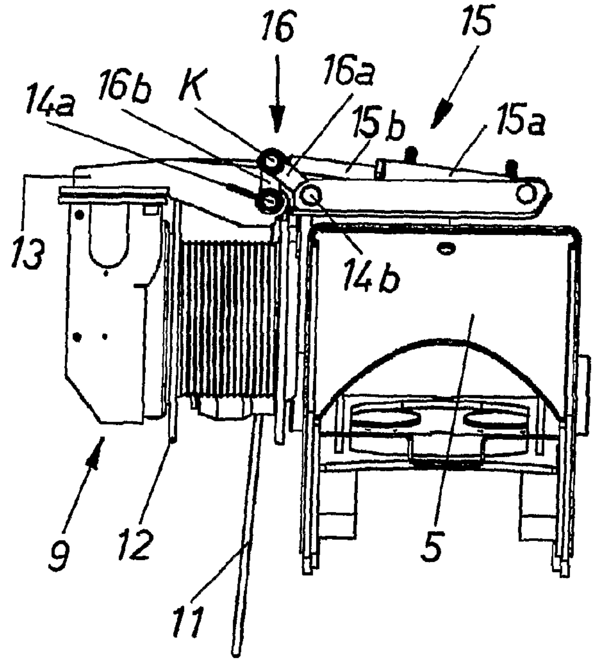
FIG. 2*a*, 2*b* show vertical sections through the crane arm with the winch in the working and transport position respectively.
Figure 2B:
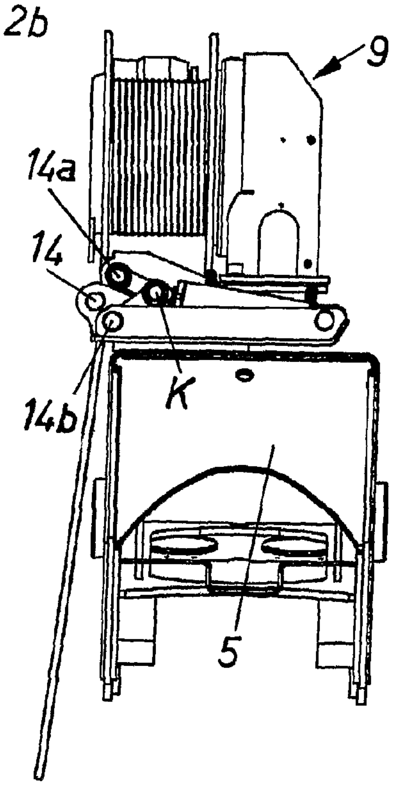

FIG. 2*a* and FIG. 2*b* are each a vertical section through the crane arm 5 according to FIG. 1 a and FIG. 1*b*, i.e. the position of the winch 9 in the working or transport position. FIG. 2*a* shows the folded-down position of the winch 9 in relation to the crane arm 5, corresponding to the position of the winch 9 according to FIG. 1*b*. The winch 9 has at least one cable drum 12, wherein the cable 11 can be wound up or unwound by rotating the cable drum 12. Furthermore, the winch 9 comprises a bearing part 13 which can be pivoted about an axis 14 relative to the crane arm 5. At least one linear drive 15 in the form of a piston-cylinder unit 15*a*, 15*b*, which pivots the bearing part 13 of the winch 9 via a lever apparatus 16, is provided for adjusting the winch 9 between the transport and working position. The lever apparatus 16 comprises expediently a knee lever with two one-armed levers 16*a* and 16*b*, the free end of the piston rod 15*b* of the piston-cylinder unit 15*a*, 15*b* acting, in the exemplary embodiment shown, directly on the knee K of the articulated connection between the two levers 16*a*, 16*b*. The ends of the two levers 16*a* and 16*b* that are remote from the knee K act, on the one hand, on a further rotatable articulation point 14*a* of the bearing part 13 and also, on the other hand, on a further—crane arm-side—articulation point 14*b*. In FIG. 2*a* the piston rod 15*b* is in an extended state relative to the cylinder 15*a*. As the piston rod 15*b* is retracted into the cylinder 15*a*, the bearing part 13 can be pivoted without difficulty, by way of the knee lever kinematics, about the axis 14 thereof until the position of the winch 9 that is shown in FIG. 2*b* is reached. The illustration shown in FIG. 2*b* thus corresponds to the folded-up position of the winch 9 according to FIG. 1*a*, which—as previously mentioned—can be, depending on the embodiment of the type of crane, either the working or the transport position.

Figure 3:
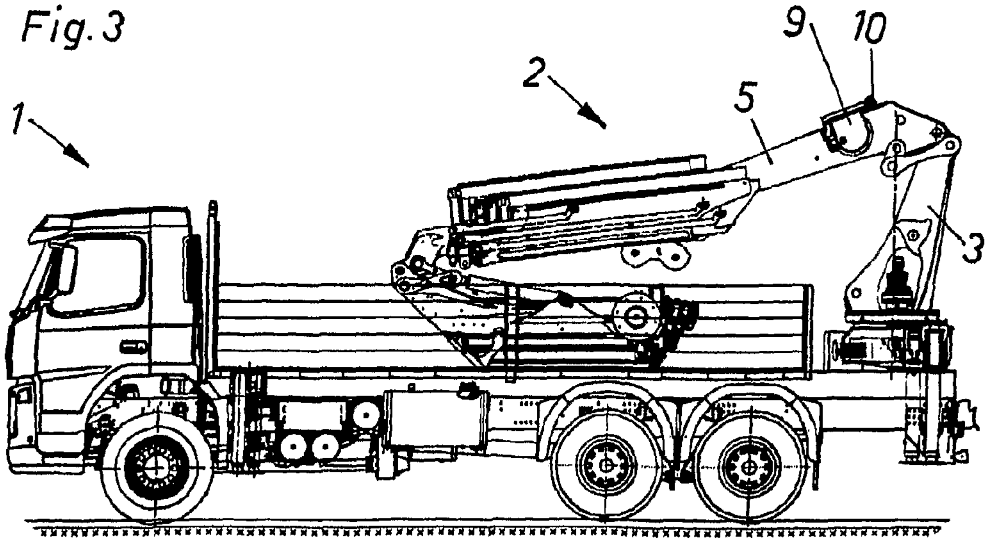
FIG. 3 shows a side view of a transport vehicle with a mounted loading crane.

FIG. 3 shows a side view of a transport vehicle 1 with a loading crane 2 mounted thereon. The loading crane 2 comprises, by way of example, a rotatable crane pillar 3 on which there is arranged a crane arm 5 with the winch 9 which can be moved, by way of an adjusting means 10, selectively into a transport or working position.

Figure 4A:
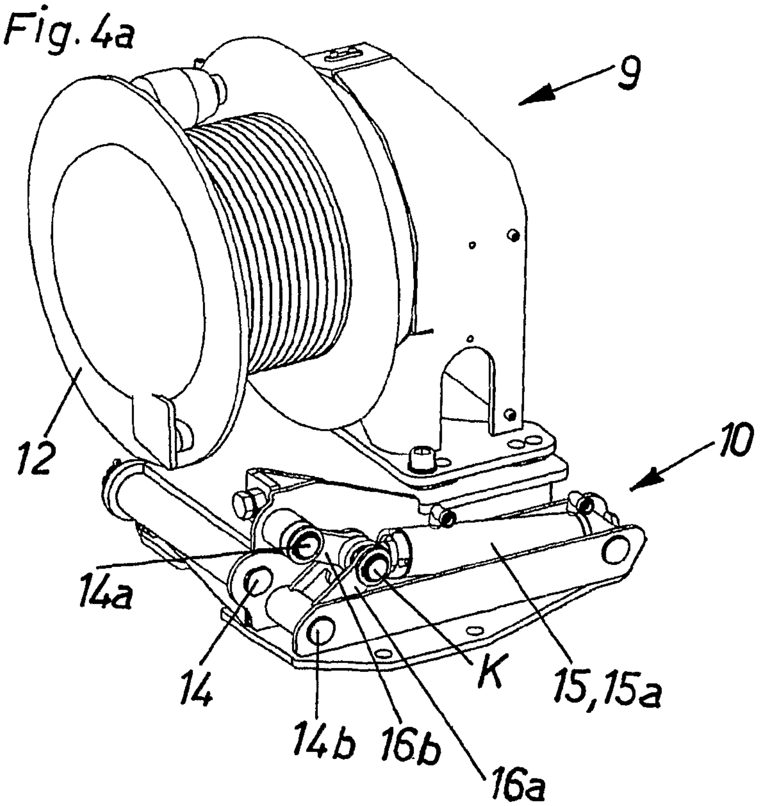
FIG. 4*a*, 4*b* show perspective views of the winch in the working and in the transport position.
Figure 4B:
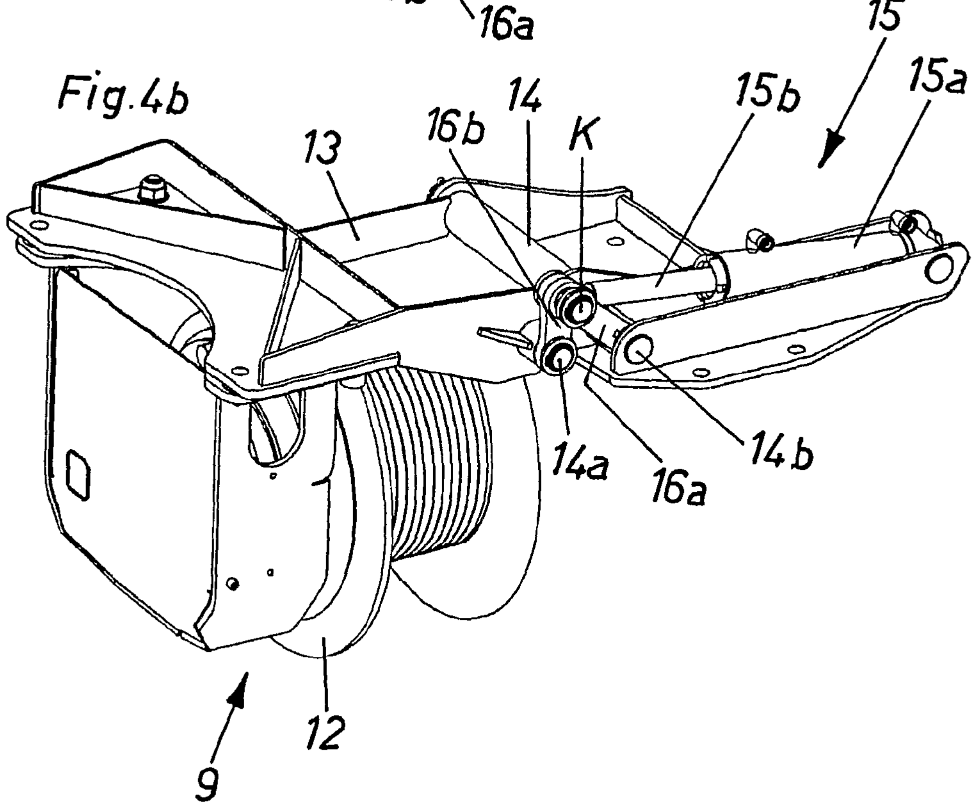

FIG. 4*a* and FIG. 4*b* show perspective views of the working and transport positions of the winch 9. An adjusting mechanism 10, which has at least one linear drive 15 in the form of a piston-cylinder unit 15*a*, 15*b* and a lever apparatus 16 in the form of the two knee levers 16*a*, 16*b*, is provided for this purpose. The winch 9, which is arranged on the bearing part 13 and has its cable drum 12, is mounted so as to be able to pivot about the axis 14. The piston-cylinder unit 15*a*, 15*b* acts directly on a knee K of the knee lever. The bearing part 13 has a rotatable articulation point 14*a* which is set apart from the axis 14 and on which the lever 16*b* acts. The other lever 16*a* is articulated to an articulation point 14*b* associated with the crane arm 5.

FIG. 4*b* shows the swiveled-out position of the winch 9, the piston rod 15*b* being shown in the extended position in relation to the cylinder 15*a*. The lever apparatus with the two levers 16*a*, 16*b* converts a linear movement of the piston rod 15*b* into a pivoting movement of the winch 9 which is mounted on the bearing part 13, the pivot angle being beneficially between 0° and 180°, preferably between 0° and about 90°.

The present invention is not limited to the exemplary embodiment shown, but includes or extends to all variants and technical equivalents which may fall under the scope of the following claims. The positional indications selected in the description, such as for example at the top, at the bottom, laterally, etc., are based on the above-described and also illustrated figures and may, in the event of a change in position, be transferred analogously to the new position. In principle, it is also possible for the winch to perform, between the limited movement between the transport position and the working position, a linear movement or else a combination of a linear and a pivoting movement.

The invention claimed is:

1. An arrangement comprising:
a winch for hoisting loads; and
an adjusting mechanism for adjusting the winch between a working position and a transport position,
wherein the adjusting mechanism includes a lever apparatus and a linear drive, and the linear drive interacts with the lever apparatus to adjust the winch,
wherein the lever apparatus includes a knee lever, and
wherein the adjusting mechanism is configured to mount the winch on a crane arm such that the winch can pivot about an axis which is substantially parallel to a longitudinal axis of the crane arm.

2. The arrangement of claim 1, wherein the lever apparatus converts a linear movement of the linear drive into a pivoting movement of the winch.

3. The arrangement of claim 1, wherein the lever apparatus acts on a bearing part of the winch.

4. The arrangement of claim 3, wherein the bearing part has a pivot axis and a rotatable articulation point which is arranged offset from the pivot axis, the lever apparatus acting on the rotatable articulation point.

5. The arrangement of claim 1, wherein the linear drive acts on the knee of the knee lever.

6. The arrangement of claim 1, wherein the linear drive is a piston-cylinder unit.

7. The arrangement of claim 1, wherein the linear drive is a hydraulically operable piston-cylinder unit.

8. The arrangement of claim 1, wherein the winch has a cable drum onto which a load bearing cable can be wound.

9. A crane arm with the arrangement of claim 1 mounted thereon, wherein the winch pivots between the working position and the transport position about an axis which is substantially parallel to the longitudinal axis of the crane arm.

10. A crane comprising:
a crane pillar;
a crane arm which is movable relative to the crane pillar; and
the arrangement of claim 1 mounted on the crane arm,
wherein the winch pivots between the working position and the transport position about an axis which is substantially parallel to the longitudinal axis of the crane arm.

11. The crane of claim 10, wherein the adjusting mechanism is mounted on an upper surface of the crane arm, and the winch is disposed above the upper surface of the crane arm when the winch is in the working position, and is disposed at a side surface of the crane arm when the winch is in the transport position.

12. The crane of claim 10, wherein the winch is disposed above an upper surface of the crane arm when the winch is in the working position, and is disposed at a side surface of the crane arm when the winch is in the transport position.

13. The crane of claim 10, wherein the lever apparatus converts a linear movement of the linear drive into a pivoting movement of the winch.

14. The crane of claim 10, wherein the lever apparatus acts on a bearing part of the winch.

15. The crane of claim 14, wherein the bearing part has a pivot axis and a rotatable articulation point which is arranged offset from the pivot axis, the lever apparatus acting on the rotatable articulation point.

16. The crane of claim 10, wherein the linear drive acts on the knee of the knee lever.

17. The crane of claim 10, wherein the linear drive is a piston-cylinder unit.

18. The crane of claim 10, wherein the linear drive is a hydraulically operable piston-cylinder unit.

* * * * *